US012429960B2

(12) United States Patent
Lin et al.

(10) Patent No.: US 12,429,960 B2
(45) Date of Patent: *Sep. 30, 2025

(54) MOUSE

(71) Applicant: Chicony Electronics Co., Ltd., New Taipei (TW)

(72) Inventors: Chung-Yao Lin, New Taipei (TW); Ho-Chin Tsai, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,241

(22) Filed: May 8, 2024

(65) Prior Publication Data

US 2024/0288951 A1 Aug. 29, 2024

Related U.S. Application Data

(63) Continuation of application No. 18/320,493, filed on May 19, 2023, now Pat. No. 12,013,989.

(30) Foreign Application Priority Data

Jun. 22, 2022 (TW) .................................. 111123299

(51) Int. Cl.
 *G06F 3/0354* (2013.01)
(52) U.S. Cl.
 CPC .. *G06F 3/03543* (2013.01); *G06F 2203/0332* (2013.01); *G06F 2203/0334* (2013.01)
(58) Field of Classification Search
 CPC .. G09G 3/3618; G09G 3/3648; G09G 3/3659; G09G 2300/0814; G09G 2300/0823; G09G 2300/0842; G09G 2300/0852; G09G 2310/0235; G09G 2310/0251; G09G 2320/0204; G09G 2320/0247; G09G 3/3614

See application file for complete search history.

(56) References Cited

U.S. PATENT DOCUMENTS

| | | | |
|---|---|---|---|
| 10,401,979 B2 | 9/2019 | Wang et al. | |
| 2003/0214484 A1* | 11/2003 | Haywood | G06F 3/0338 345/163 |
| 2017/0192536 A1* | 7/2017 | Wang | G06F 3/03543 |
| 2018/0239447 A1 | 8/2018 | Lee | |
| 2021/0018993 A1 | 1/2021 | Odgers et al. | |

FOREIGN PATENT DOCUMENTS

| | | |
|---|---|---|
| CN | 101923403 A | 12/2010 |
| TW | 201520829 A | 6/2015 |

* cited by examiner

*Primary Examiner* — Nelson M Rosario
(74) *Attorney, Agent, or Firm* — MUNCY, GEISSLER, OLDS & LOWE, P.C.

(57) ABSTRACT

A mouse includes a base and a mouse body. The base has a leaning surface and a bottom surface, an angle is between an extension direction of the leaning surface and the bottom surface, the leaning surface is arranged slantingly with respect to the bottom surface. The mouse body includes a housing. The mouse body is detachably disposed on the leaning surface, the housing leans against the leaning surface, and the mouse body has a first operation mode and a second operation mode. Under the first operation mode, the mouse body is disposed in the base with a first orientation, and under the second operation mode, the mouse body is detached from the leaning surface of the base and rotated to a second orientation and disposed in the base.

11 Claims, 12 Drawing Sheets

MOUSE

CROSS-REFERENCE TO RELATED APPLICATION

This application is a continuation application Ser. No. 18/320,493, filed on May 19, 2023 with claiming foreign priority of TW111123299. The prior application is herewith incorporated by reference in its entirety.

BACKGROUND

Technical Field

The instant disclosure relates to input devices for electronic devices, in particular, to a vertical mouse.

Related Art

Vertical mice are electronic input devices for reducing burden on user's hands. A main purpose of the vertical mice is to allow the user's palm to hold the mouse vertically by configuring the appearance of the vertical mouse ergonomically.

Most users operate the mice with their right hands. Thus, most manufacturers produce vertical mice suitable for right-handed users. As a result, in general, vertical mice suitable for left-handed users cannot be obtained easily, and the user may obtain a vertical mouse for left-handed users through customized processes. Consequently, the market-available products are not friendly for the users who are left-handed users and who use the vertical mice.

SUMMARY

In view of this, according to some embodiments, a mouse is provided. The mouse comprises a base and a mouse body. The base has a a leaning surface and a bottom surface, an angle is between an extension direction of the leaning surface and the bottom surface, the leaning surface is arranged slantingly with respect to the bottom surface. The mouse body comprises a housing, the mouse body is detachably disposed on the leaning surface, the housing leans against the leaning surface, and the mouse body has a first operation mode and a second operation mode. Under the first operation mode, the mouse body is disposed in the base with a first orientation, and under the second operation mode, the mouse body is detached from the leaning surface of the base and rotated to a second orientation and disposed in the base.

According to some embodiments, the user can place the mouse on an operating surface and operates the mouse, with the palm of the user placed standingly, thus reducing the pressure applied to the user's wrist during the operation of the mouse. Moreover, according to some embodiments, the user just needs to rotate the base and the mouse body respectively to allow the mouse to be suitable for right-handed users or left-handed users. Therefore, according to some embodiments, the same mouse is suitable for both the right-handed users and left-handed users, and the mouse thus provides a great convenience for the users.

In some embodiments, a back surface of the housing of the mouse body is symmetrically arranged along a first symmetry axis and is symmetrically arranged along a second symmetry axis perpendicular to the first symmetry axis, the back surface leans against the leaning surface.

In some embodiments, the first symmetry axis and the second symmetry axis are intersected at a symmetry center, the mouse body is selectively disposed on the leaning surface with one of a plurality of orientations, and the mouse body is rotated about the symmetry center, so that the mouse body is arranged with multiple orientations.

In some embodiments, the profile of the leaning surface overlaps the profile of the back surface being rotated about the symmetry center, the symmetry center is at a central position of the first symmetry axis, and the symmetry center is also at a central position of the second symmetry axis.

In some embodiments, the symmetry center of the mouse body is correspondingly on the leaning surface of the base.

In some embodiments, the base further has a first positioning portion, a back surface of the mouse body further has a second positioning portion, and the mouse body is fitted over the first positioning portion through the second positioning portion.

In some embodiments, the first positioning portion and the second positioning portion are a block or a slot respectively, and the slot is fitted over the block.

In some embodiments, the base further comprises a first magnetic attractive member, and the mouse body further comprises a second magnetic attractive member and a third magnetic attractive member. When the mouse body is disposed on the leaning surface with the first orientation, the first magnetic attractive member is magnetically attracted to the second magnetic attractive member. When the mouse body is disposed on the leaning surface with the second orientation, the first magnetic attractive member is magnetically attracted to the third magnetic attractive member.

In some embodiments, the third magnetic attractive member and the second magnetic attractive member are at opposite sides with respect to the first symmetry axis.

In some embodiments, the mouse further comprises a first communication unit and a second communication unit. The first communication unit is disposed on the base, a position of the first communication unit corresponds to a position of the leaning surface. The second communication unit is disposed on the mouse body, a position of the second communication unit corresponds to a position of the back surface, wherein the first communication unit is communicatively connected to the second communication unit.

In some embodiments, the first communication unit and the second communication unit are corresponding noncontact type communication structures.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
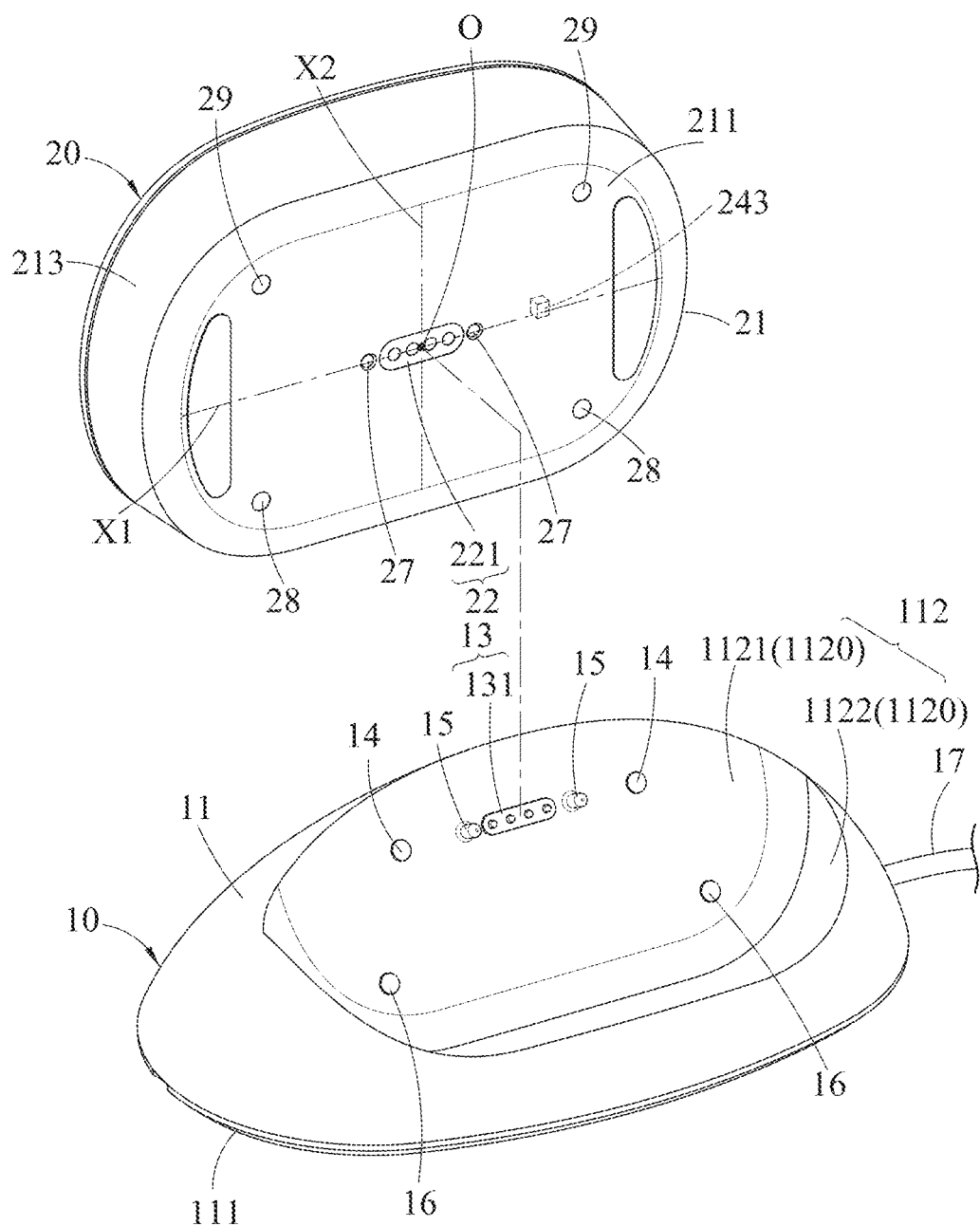
FIG. 1 illustrates an exploded view of a mouse according to an exemplary embodiment of the instant disclosure, which shows that the base and the mouse body are communicatively connected to each other in a contact type manner.
Figure 2:
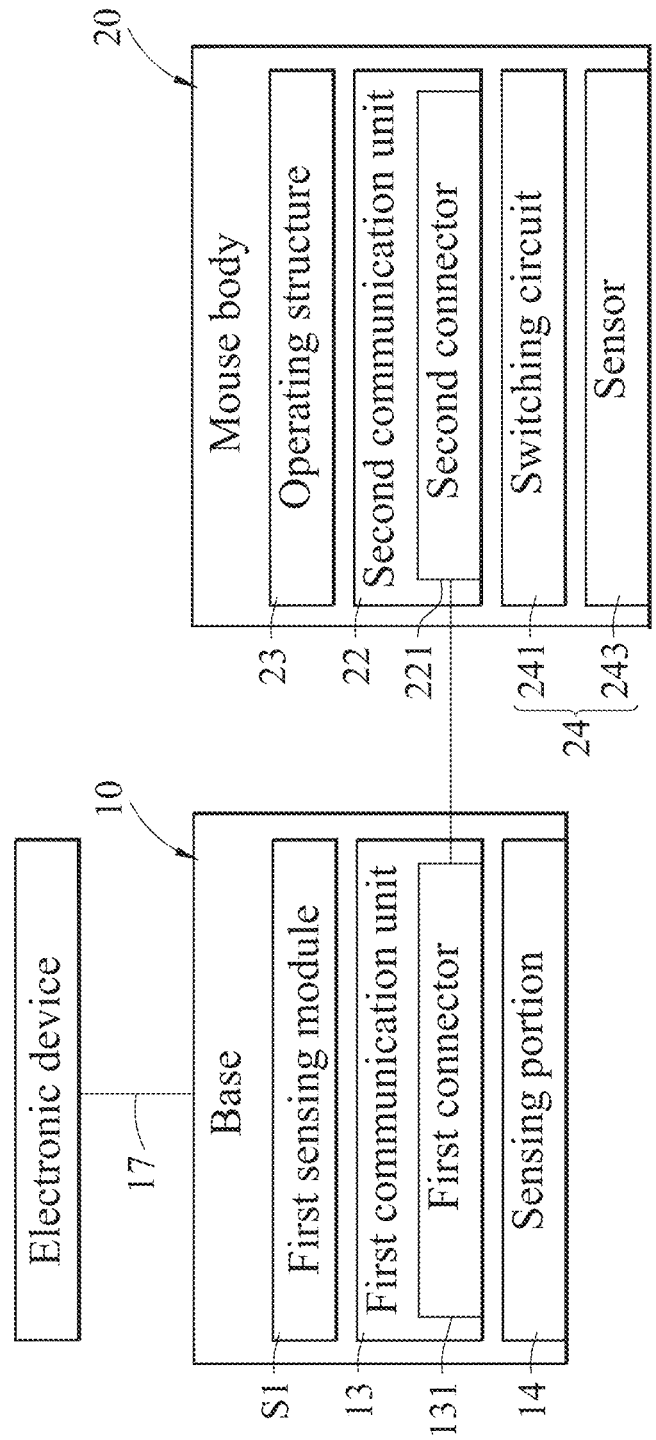
FIG. 2 illustrates a systematic block diagram of a mouse according to an exemplary embodiment of the instant disclosure, which shows that the base and the mouse body are communicatively connected to each other in a contact type manner.

With reference to FIG. 1 and FIG. 2. FIG. 1 illustrates an exploded view of a mouse according to an exemplary embodiment of the instant disclosure, which shows that the base 10 and the mouse body 20 are communicatively connected to each other in a contact type manner. FIG. 2 illustrates a systematic block diagram of a mouse according to an exemplary embodiment of the instant disclosure, which shows that the base 10 and the mouse body 20 are communicatively connected to each other in a contact type manner. The mouse is an input device of an electronic device, and the mouse is configured to control the operation of the electronic device (e.g., to move the cursor, to scroll the page, or to switch the menus). In some embodiments, the mouse comprises a base 10 and a mouse body 20. The base 10 comprises a case 11 and a receiving groove 112. The mouse body 20 comprises a housing 21, the mouse body 20 is detachably received in the receiving groove 112, the housing 21 leans against the receiving groove 112, and the mouse body 20 has a first operation mode and a second operation mode. Under the first operation mode, the mouse body 20 is received in the base 10 with a first orientation (as shown in FIG. 3), and under the second operation mode, the mouse body 20 is detached from the base 10 with the first orientation and then the mouse body 20 is received in the base 10 with a second orientation (as shown in FIG. 4).

Figure 4:
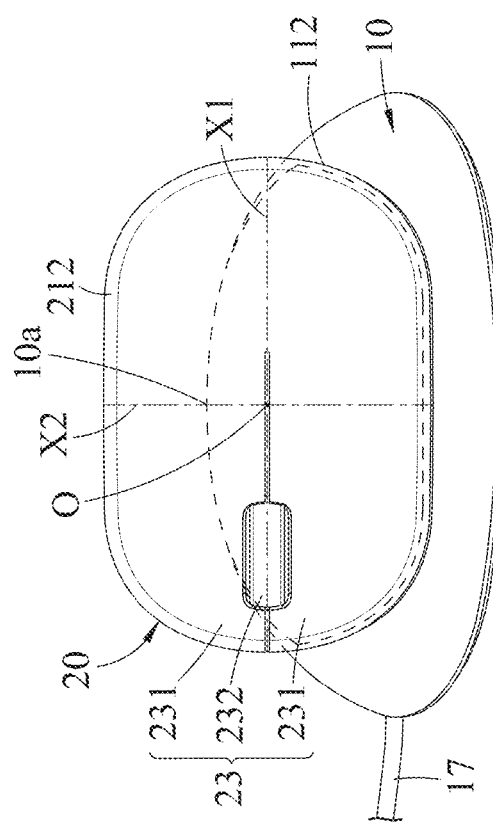
FIG. 4 illustrates a lateral view of a mouse according to an exemplary embodiment of the instant disclosure, which shows that the mouse body is under the second operation mode.
Figure 6:
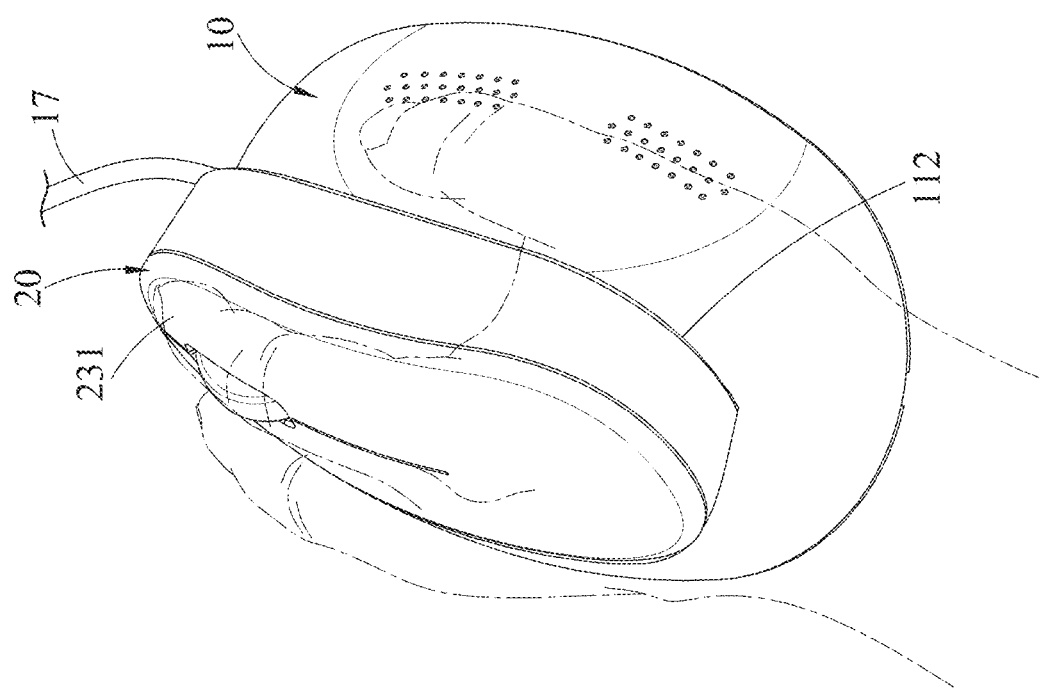
FIG. 6 illustrates a schematic operational view of a mouse according to an exemplary embodiment of the instant disclosure, which shows that the mouse body is under the second operation mode.
Figure 5:
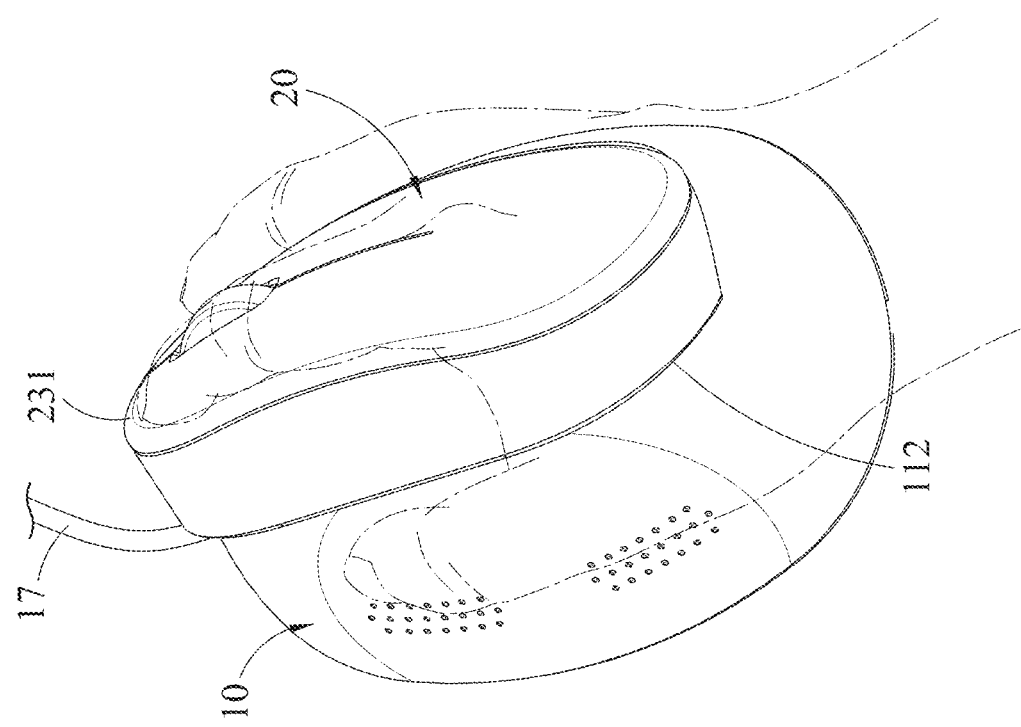
FIG. 5 illustrates a schematic operational view of a mouse according to an exemplary embodiment of the instant disclosure, which shows that the mouse body is under the first operation mode.

When the mouse body 20 is assembled on the base 10 to form a mouse, the user can hold the mouse with the palm of the user placed standingly (as shown in FIG. 5 and FIG. 6), thus reducing the pressure applied to the user's wrist during the operation of the mouse. When the user tends to change the operation mode of the mouse, the user can change the orientation of the mouse body 20 with respect to the base 10 to allow the mouse body 20 to be detached from the receiving groove 112 of the base 10. Next, the mouse body 20 is rotated to have a different orientation (for example, the mouse body 20 is rotated from the orientation shown in FIG. 3 to the orientation shown in FIG. 4). Then, the mouse body 20 is received in the receiving groove 112 of the base 10. Hence, the mouse body 20 can be received in the receiving groove 112 with different orientations to provide different operation modes.

Figure 7:
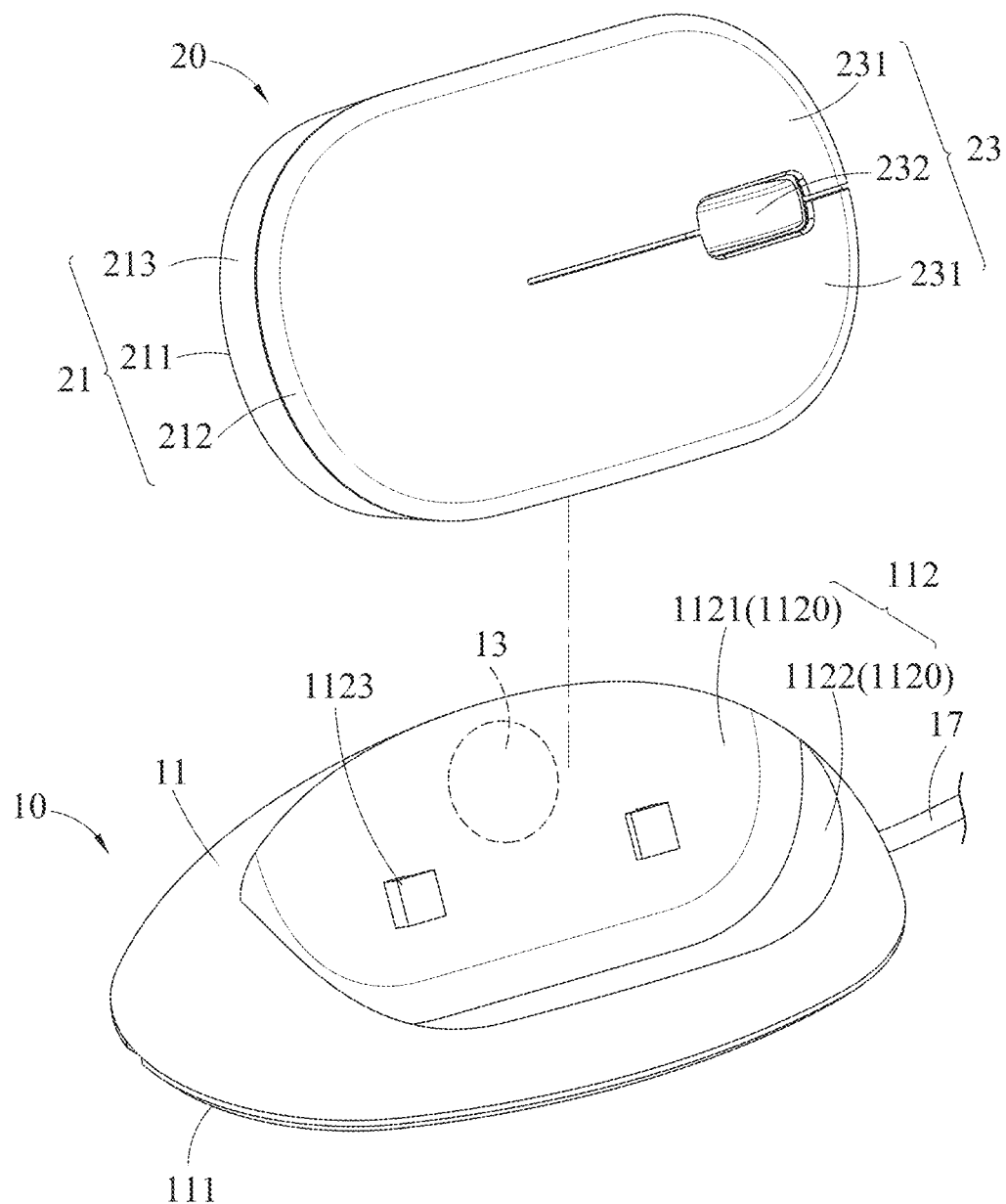
FIG. 7 illustrates a perspective view of a mouse according to an exemplary embodiment of the instant disclosure, which shows that the base is detached from the mouse body.
Figure 8:
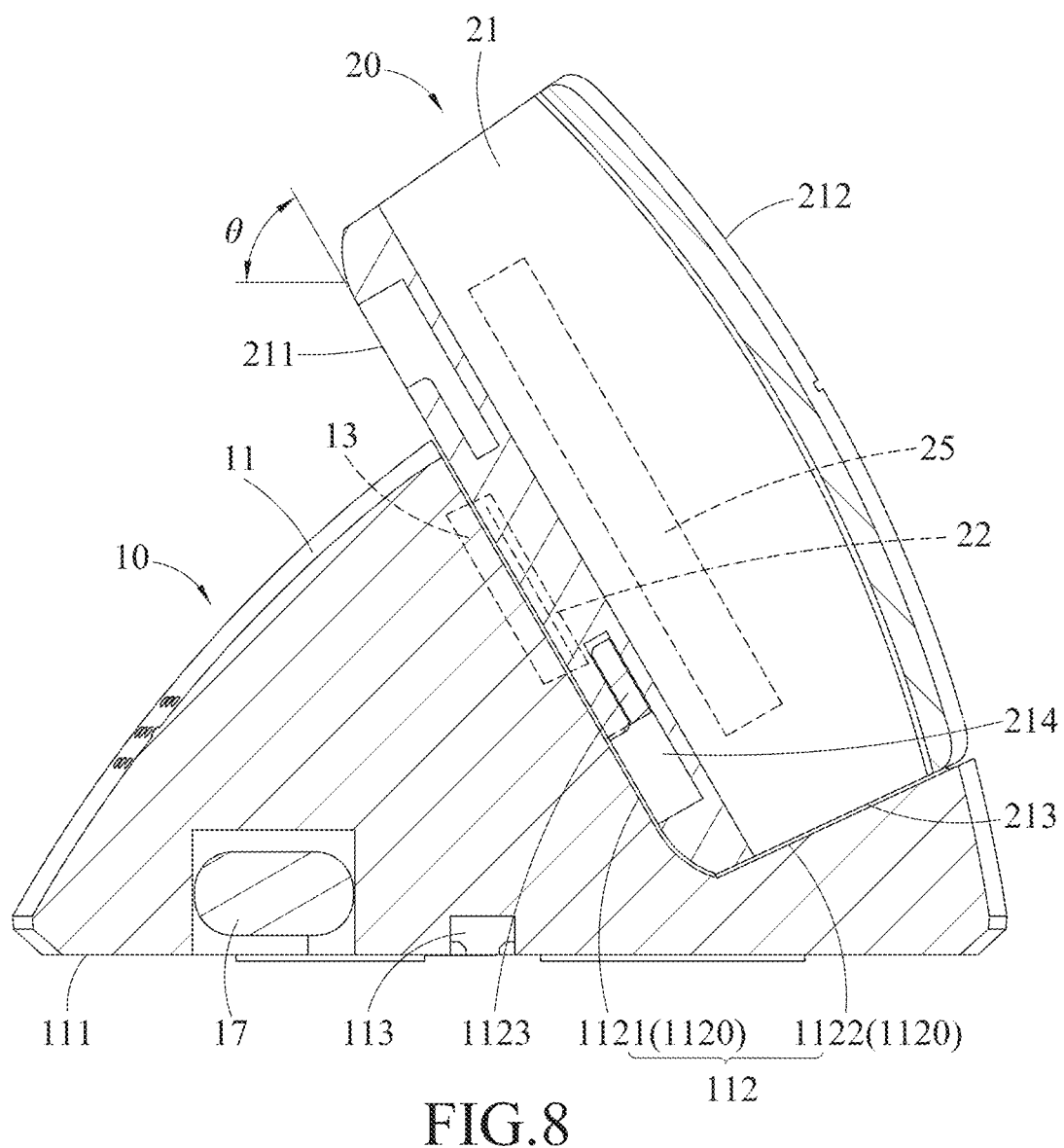
FIG. 8 illustrates a cross-sectional view of a mouse according to an exemplary embodiment of the instant disclosure.

With reference to FIG. 7 and FIG. 8. In some embodiments, the housing 21 of the mouse body 20 has a back surface 211 and a side surface 213. The side surface 213 is arranged along a profile of the back surface 211, and the back surface 211 and the side surface 213 respectively lean against the receiving groove 112. In these embodiments, the base 10 further comprises a first communication unit 13, a position of the first communication unit 13 corresponds to a position of the receiving groove 112, the mouse body 20 further comprises a second communication unit 22, and a position of the second communication unit 22 corresponds to a position of the back surface 211, so that the second communication unit 22 and the first communication unit 13 are communicatively connected to each other.

Figure 3:
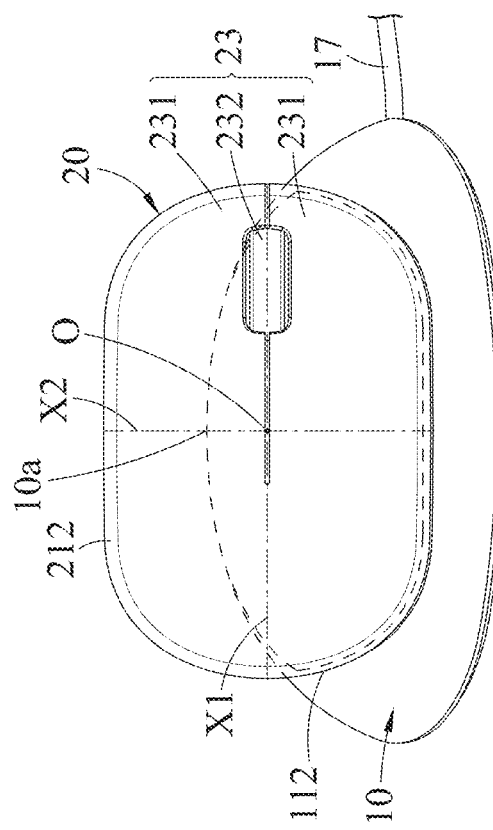
FIG. 3 illustrates a lateral view of a mouse according to an exemplary embodiment of the instant disclosure, which shows that the mouse body is under the first operation mode.

As shown in FIG. 3, in some embodiments, the back surface 211 of the mouse body 20 has a centrosymmetric shape (as shown in FIG. 3 and FIG. 4), but the instant disclosure is not limited thereto. In the case that the back surface 211 of the mouse body 20 does not have a centrosymmetric shape, a profile of the receiving groove 112 of the base 10 comprises a combination of a profile of the back surface 211 of the mouse body 20 before rotation and a profile of the back surface 211 of the mouse body 20 after rotation.

In some embodiments where the back surface 211 of the mouse body 20 has a centrosymmetric shape, the back surface 211 is symmetrically arranged along a first symmetry axis X1 and is symmetrically arranged along a second symmetry axis X2 perpendicular to the first symmetry axis X1, and the first symmetry axis X1 and the second symmetry axis X2 are intersected at a symmetry center O. In these embodiments, the profile of the back surface 211 overlaps the profile of the back surface 211 being rotated by 180 degrees about the symmetry center O, the symmetry center O is at a central position of the first symmetry axis X1, and the symmetry center O is also at a central position of the second symmetry axis X2.

With reference to FIG. 7 and FIG. 8. In some embodiments, the case 11 of the base 10 has an outer surface and an inner surface opposite to the outer surface. The inner surface is enclosed to form a receiving space, and the outer surface has a bottom surface 111 and the receiving groove 112. The bottom surface 111 is a flat surface and is configured to allow the base 10 to be placed on an operating surface (for example, the surface of a desk) for the operation of the mouse. The receiving groove 112 is opposite to the operating surface, and the receiving groove 112 is vertically configured, so that the mouse body 20 can be received in the base 10.

With reference to FIG. 7 and FIG. 8. In some embodiments, the receiving groove 112 has leaning surfaces 1120, the leaning surfaces 1120 includes a first leaning surface 1121 and a second leaning surface 1122 connected to the first leaning surface 1121. An angle θ is between an extension direction of the first leaning surface 1121 and the bottom surface 111 of the case 11. When the mouse body 20 is received in the receiving groove 112, the mouse body 20 is disposed on the leaning surface 1120 and the back surface 211 of the mouse body 20 is attached to the first leaning surface 1121, so that the mouse body 20 is arranged in a standing configuration which is arranged slantingly with respect to the bottom surface 111. In these embodiments, when the mouse body 20 is received in the receiving groove 112 in the standing configuration, the side surface 213 of the mouse body 20 is also attached to the second leaning surface 1122, so that both the back surface 211 and the side surface 213 of the mouse body 20 lean against the receiving groove 112. Therefore, the stability of the mouse body 20 in the standing configuration can be enhanced.

With reference to FIG. 8. In some embodiments, the angle θ is in a range between 50 degrees and 70 degrees to allow the user's palm to hold the mouse closely. Alternatively, in some embodiments, the angle θ may be in a range between 55 degrees and 65 degrees to allow the user's palm to hold the mouse comfortably. Alternatively, in some embodiments, the angle θ may be 55 degrees, 57 degrees, 60 degrees, or the like.

In some embodiments, to increase the stability upon assembling the mouse body 20 on the base 10 and the stability for holding the mouse with the user's palm, the base 10 has a top portion 10a, the top portion 10a is on the first leaning surface 1121, the symmetry center O of the mouse body 20 is correspondingly in the receiving groove 112 of the base 10 (that is, as shown in FIG. 3, the top portion 10a of the base 10 exceeds a half of the length of the mouse body 20, the top portion 10a is higher than the symmetry center O, a portion of the back surface 211 of the mouse body 20 is about two-third of the area of the back surface, and the portion of the back surface 211 leans against the inner wall of the receiving groove 112), and the center of gravity of the mouse body 20 is substantially at a central position of the entire mouse, but the instant disclosure is not limited thereto. In some embodiments, the symmetry center O of the mouse body 20 is correspondingly on the top portion 10a of the base 10 (the top portion 10a of the base 10 corresponds to the half of the length of the mouse body 20).

With reference to FIG. 3. In some embodiments, the mouse body 20 is an elongated body with two curved ends. Therefore, a length of the first symmetry axis X1 and a length of the second symmetry axis X2 are different from each other. In these embodiments, the length of the first symmetry axis X1 is greater than the length of the second symmetry axis X2, so that the profile of the mouse body 20 is adapted to allow the user's palm to hold properly.

In some embodiments, under the first operation mode, the mouse body 20 is received in the base 10 with the first orientation (as shown in FIG. 3); under the second operation mode, the mouse body 20 is received in the base 10 with the second orientation (as shown in FIG. 4). Therefore, according to one or some embodiments of the instant disclosure, the user can hold the mouse standingly, and the operation mode of the mouse can be switched between the first operation mode and the second operation mode according to different user requirements. Therefore, the adaptability of the operation of the mouse can be enhanced.

In some embodiments, the first operation mode is an operation mode suitable for right-handed users to operate the mouse (as shown in FIG. 5), and the second operation mode is an operation mode suitable for left-handed users to operate the mouse (as shown in FIG. 6). Therefore, the user just needs to rotate the base 10 and the mouse body 20 from 0 degree to 180 degrees respectively to allow the mouse to be suitable for right-handed users or left-handed users. Therefore, according to some embodiments, the same mouse is suitable for both the right-handed users and left-handed users, and the mouse thus provides a great convenience for the users.

With reference to FIG. 7. In some embodiments, the mouse body 20 further comprises an operating structure 23, the housing 21 of the mouse body 20 has a front surface 212 opposite to the back surface 211, and the back surface 211 and the front surface 212 are respectively connected to two ends of the side surface 213. In these embodiments, the mouse body 20 is a two-button mouse. Specifically, in these embodiments, the operating structure 23 comprises two operating buttons 231 and a wheel 232, the operating buttons 231 and the wheel 232 are disposed on the front surface 212 and at one end of the first symmetry axis X1 (as shown in FIG. 3), and the wheel 232 is between the two operating buttons 231. In these embodiments, the back surface 211, the front surface 212, and the side surface 213 of the mouse body 20 are enclosed to form the receiving space for receiving the second communication unit 22, but the instant disclosure is not limited thereto.

In some embodiments, for the configuration where the user operates the mouse right-handed (as shown in FIG. 3 and FIG. 5), the user's right index finger presses the left button of the mouse for controlling a primary button of the mouse, and the user's right middle finger presses the right button of the mouse for controlling a secondary button of the mouse. In some embodiments where the first operation mode is a right-handed operation mode and the second operation mode is a left-handed operation mode (as shown in FIG. 4 and FIG. 6), the operation of the mouse under the first operation mode is the same as the operation of a mouse known to the inventor. However, when the orientation of the mouse body 20 is changed from the first orientation to the second orientation, and the operation mode of the mouse body 20 is changed to the second operation mode to allow the user's left hand to operate the mouse, the operating button 231 pressed by the user's left index finger is the secondary button (the right button of the mouse) under the first operation mode.

In some embodiments, when the user operates the mouse by the user's right hand (as shown in FIG. 3 and FIG. 5), the bottom surface 111 of the base 10 of the mouse is attached to the operating surface (for example, the surface of a desk), the receiving groove 112 faces the right part of the user and receives mouse body 20, the back surface 211 and the side surface 213 of the mouse body 20 are attached to the receiving groove 112, and the front surface 212 faces the right side of the base 10. Under this situation, the user's right palm is standingly placed on the operating surface; that is, the user's right little finger is attached to the operating surface, and the user's palm is away from the operating surface, so that the user's palm is in a standing configuration and not parallel to the operating surface. Therefore, under this situation, the user's right index finger and middle finger correspond to the operating buttons 231 of the mouse body 20, and the user's thumb can hold a side of the base 10 different from a side at which the receiving groove 112 is. Hence, during the operations, the user's forearm does not need to be twisted by 90 degrees, and the user operates the mouse by a gesture like that the user just naturally hangs down the hand on the operating surface, so that the pressure applied on the user's wrist can be reduced, thereby reducing the muscle strain of the user who operates the mouse for long periods of time.

In some embodiments, when the user operates the mouse by the user's left hand (as shown in FIG. 4 and FIG. 6), firstly, the base 10 is moved to an orientation symmetrical to the original orientation of the base 10; that is, the base 10 is rotated by 180 degrees about the user, so that the receiving groove 112 of the base 10 is rotated from facing right to facing left. Under this configuration, the operating button 231 of the mouse body 20 is also changed from facing front to facing back (not shown). Next, the mouse body 20 is completely detached from the base 10 and is rotated by 180 degrees about the symmetry center O, so that the operating button 231 of the mouse body 20 is also changed from facing back to facing front, thereby allowing the mouse to be under a left-handed operation mode. It is noted that, in the foregoing embodiments, the base 10 and the mouse body 20 are together rotated by 180 degrees and then the mouse body 20 is rotated alone, but the instant disclosure is not limited thereto. Alternatively, in some embodiments, the base 10 and the mouse body 20 are firstly completely detached from each other and respectively rotated by 180 degrees, and then the base 10 and the mouse body 20 are assembled with each other again, so that the operation mode of the mouse can be switched. Under this configuration, the user's left palm is standingly placed on the operating surface to operate the mouse; that is, the user's left index finger and middle finger correspond to the operating buttons 231 of the mouse body 20, and the user's thumb holds the base 10.

In some embodiments, the shape of the mouse body 20 corresponds to the shape of the receiving groove 112 of the base 10. The shape of the mouse body 20 and the shape of the receiving groove 112 of the base 10 may be adjusted to have a plurality of orientations for positioning according to different user requirements. For example, as to the different orientations of the mouse body 20, the mouse body 20 in the receiving groove 112 may be rotated from the original zero degree (the first operation mode shown in FIG. 3 and FIG. 5) to 180 degrees (the second operation mode shown in FIG. 4 and FIG. 6), but the instant disclosure is not limited thereto. In some embodiments, as to the different orientations of the mouse body 20, the mouse body 20 in the receiving groove 112 may be rotated from the original 10 degrees (the first operation mode) to 170 degrees (the second operation mode), but the instant disclosure is not limited thereto. In some embodiments, as to the different orientations of the mouse body 20, the mouse body 20 in the receiving groove 112 may be rotated from the original 30 degrees (the first operation mode) to 150 degrees (the second operation mode), but the instant disclosure is not limited thereto. It is noted that, the first operation mode and the second operation mode are not limited thereto, and the mouse may have several operation modes. With reference to FIG. 2 to FIG. 9. In some embodiments, the base 10 further comprises a first sensing module S1. The first sensing module S1 is disposed in the receiving space of the case 11 and partially exposed from the bottom surface 111 to detect a movement of the base 10. In some embodiments, the mouse may be a mechanical mouse, an optical mouse, or a laser mouse, and the first sensing module S1 is correspondingly a wheel, an optical sensor, or a laser sensor according to the type of the mouse.

The mouse according to a first embodiment of the instant disclosure is illustrated below accompanied with FIG. 1, FIG. 2, and FIG. 9. In this embodiment, the connection between the base 10 and the mouse body 20 of the mouse and the electronic device is described as below. The mouse is a wired mouse and is communicatively connected to the electronic device through a wiredly connection, and the mouse body 20 is communicatively connected to the base 10 in a contact type manner.

Figure 9:
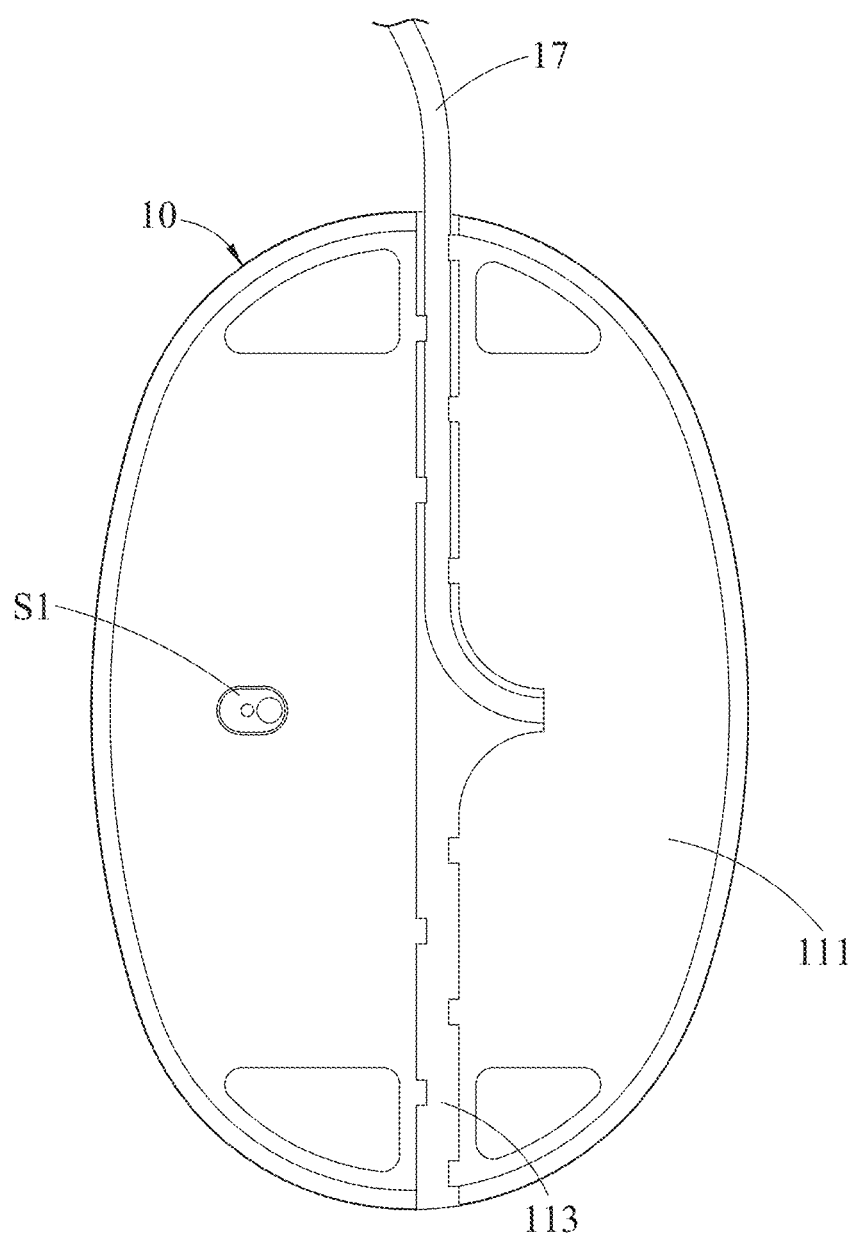
FIG. 9 illustrates a bottom view of a mouse according to an exemplary embodiment of the instant disclosure.
Figure 10:
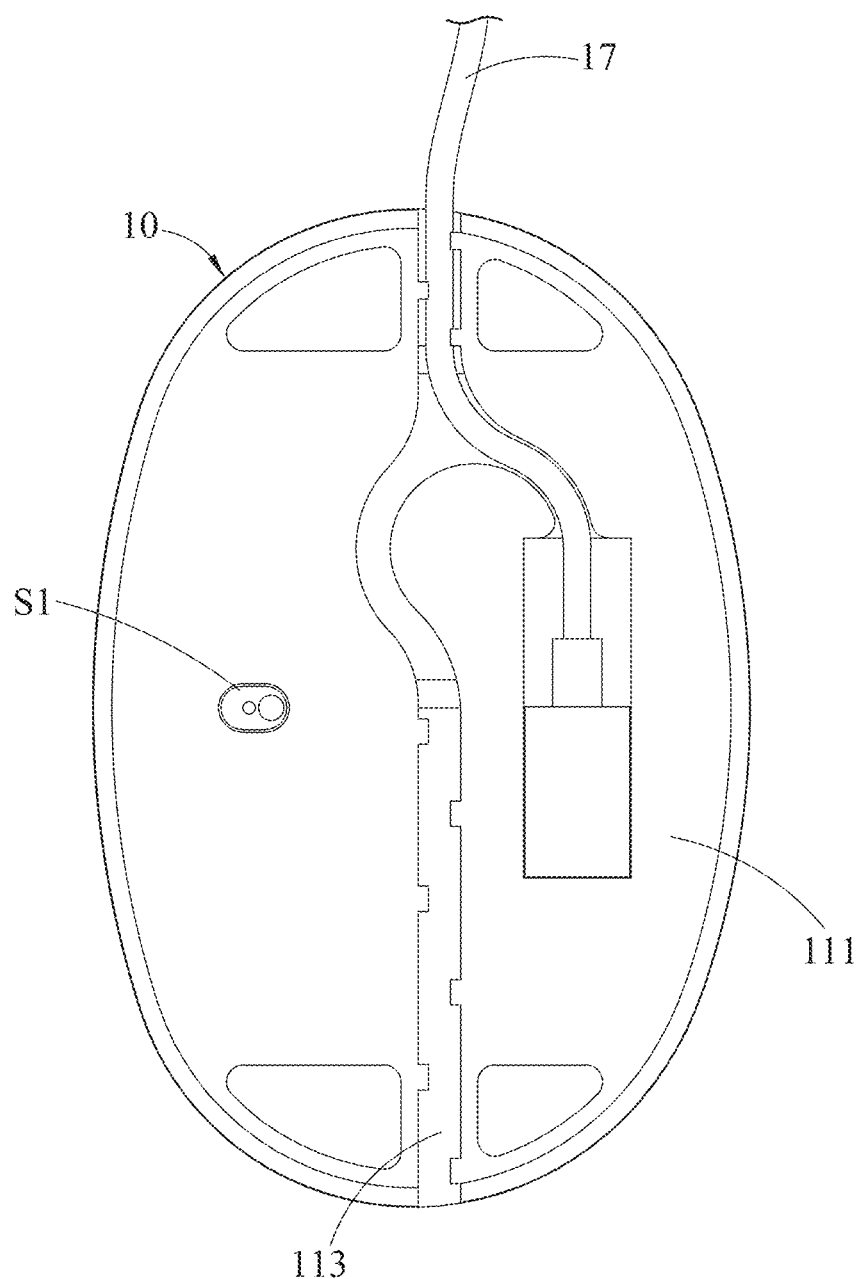
FIG. 10 illustrates a bottom view of a mouse according to another exemplary embodiment of the instant disclosure.

With reference to FIG. 9 and FIG. 10. In some embodiments, the base 10 of the mouse comprises an electrical connection cable 17. One of two ends of the electrical connection cable 17 is connected to the bottom surface 111 of the base 10, and the other end of the electrical connection cable 17 is connected to a connection port of the electronic device (such as a computer). Hence, the mouse transmits information to the electronic device through the electrical connection cable 17 and obtains electricity from the electronic device through the electrical connection cable 17.

With reference to FIG. 1 and FIG. 2. In these embodiments, the first communication unit 13 and the second communication unit 22 are communicatively connected to each other in a contact type manner. In these embodiments, the first communication unit 13 of the base 10 further comprises a first connector 131, and the second communication unit 22 of the mouse body 20 comprises a second connector 221. The first connector 131 is exposed from the first leaning surface 1121 of the receiving groove 112, and the second connector 221 is exposed from the back surface 211 of the housing 21 of the mouse body 20. When the mouse body 20 is received in the receiving groove 112, the first connector 131 abuts against the second connector 221, so that the first communication unit 13 and the second communication unit 22 are communicatively connected to each other.

With reference to FIG. 1 and FIG. 2. In some embodiments, the base 10 is wiredly communicatively connected to the electronic device through the electrical connection cable 17, and the base 10 is connected to the second connector 221 of the second communication unit 22 of the mouse body 20 through the first connector 131 of the first communication unit 13, so that the base 10 and the mouse body 20 are communicatively connected to each other. In this embodiment, the user assembles the mouse body 20 on the base 10. When the user assembles the mouse body 20 on the base 10 to operate the mouse to move, the first sensing module S1 of the base 10 transmits a movement signal to the electronic device through the electrical connection cable 17 to correspond to the movement of the cursor. When the user operates the mouse and controls the operating structure 23 of the mouse body 20, the operating structure 23 generates a control signal, and the control signal is transmitted to the first connector 131 of a microcontroller unit (MCU) (not shown) of a circuit board in the base 10 through the second connector 221 of the second communication unit 22. After the first connector 131 receives the control signal, the control signal of the mouse body 20 is transmitted to the electronic device through the electrical connection cable 17 between the base 10 and the electronic device to control the electronic device.

With reference to FIG. 1. In some embodiments, the first connector 131 may be a pogo pin connector or other types of connectors (e.g., a blade pin connector), and the second connector 221 is a conductive contact corresponding to the pogo pin connector to achieve the communication connection between the first connector 131 and the second connector 211, but the instant disclosure is not limited thereto.

With reference to FIG. 1 and FIG. 2. In some embodiments, to meet the user's operation preferences, the mouse further comprises a switching module 24. The switching module 24 is communicatively connected to the operating structure 23 to switch functions of the operating structure 23. The switching module 24 may be disposed on the base 10 or the mouse body 20, but the instant disclosure is not limited thereto.

With reference to FIG. 1 and FIG. 2. In some embodiments, the functions of the operating buttons 231 are automatically switched through the detection of the change of the orientation of the mouse body 20. In this embodiment, the base 10 comprises two sensing portions 14, and the switching module 24 is disposed on the mouse body 20 and comprises a switching circuit 241 and a sensor 243.

With reference to FIG. 1 and FIG. 2. In these embodiments, the two sensing portions 14 of the base 10 are disposed in the receiving groove 112, the switching circuit 241 and the sensor 243 are disposed in the housing 21 of the mouse body 20, and the sensor 243 is at one side of the second symmetry axis X2 and electrically connected to the switching circuit 241. Under the first operation mode, a position of the sensor 243 corresponds to a position of one of the two sensing portions 14; under the second operation mode, the position of the sensor 243 corresponds to a position of the other sensing portion 14. When the sensing portion 243 sensed by the sensor 14 is changed, the switching circuit 241 switches the functions of the operating buttons 231. In this embodiment, the sensor 243 may be a bipolar Hall sensor, and the two sensing portions 14 on the base 10 are magnets with opposite polarities. Under this configuration, when the orientation of the mouse body 20 is changed, the sensor 243 can determine the orientation of the mouse body 20 through the sensing of the magnets with different polarities. It is noted that, the implementation of the sensor 243 is not limited thereto. In some embodiments, the switching module 24 may be disposed in the base 10, and the sensing portions 14 are disposed on the mouse body 20, so that the purpose of automatically switching the functions of the operating buttons 231 can also be achieved.

In some embodiments, the sensor 243 may be a G-sensor. The sensor 243 in the mouse body 20 detects that the mouse body 20 is flipped from the first operation mode to the second operation mode or detects the change of the axial acceleration when the mouse body 20 is placed on the desk. The X axis, the Y axis, and the Z axis of the sensor 243 with respect to the center of earth are utilized to obtain three angles, the microcontroller unit (MCU) of the circuit board in the mouse body 20 determines whether the mouse body 20 is under the first operation mode, the second operation mode, or operating alone on an operating surface (e.g., the surface of the desk) according to the changes of the accelerations of the sensor 243 along the X axis, the Y axis, and the Z axis (according to whether the angles are within a certain range). Therefore, the operation mode of the mouse body 20 can be determined and the possibility of signal misjudgment can be reduced.

With reference to FIG. 1. In some embodiments, the base 10 further comprises a first magnetic attractive member 16, and the mouse body 20 further comprises a second magnetic attractive member 28 and a third magnetic attractive member 29. When the mouse body 20 is received in the receiving groove 112 with the first orientation, the first magnetic attractive member 16 is magnetically attracted to the second magnetic attractive member 28; when the mouse body 20 is received in the receiving groove 112 with respect to the second orientation, the first magnetic attractive member 16 is magnetically attracted to the third magnetic attractive member 29.

With reference to FIG. 1. In these embodiments, the number of the first magnetic attractive members 16 of the base 10 is two, and the two first magnetic attractive members 16 are disposed on one side of the first leaning surface 1121 adjacent to the bottom surface 111; the number of the second magnetic attractive members 28 and the number of the third magnetic attractive members 29 of the mouse body 20 are respectively two. In this embodiment, the two second magnetic attractive members 28 and the two third magnetic attractive members 29 are symmetrically arranged with respect to the first symmetry axis X1, the two second magnetic attractive members 28 are symmetrically arranged with each other with respect to the second symmetry axis X2, and the two third magnetic attractive members 29 are symmetrically arranged with each other with respect to the second symmetry axis X2. Therefore, no matter the mouse body 20 is received in the receiving groove 112 with the first orientation or the second orientation, the mouse body 20 can be positioned with the base 10 through the magnetic attraction between the magnetic attractive members. Hence, the stability for positioning the mouse body 20 with the base 10 can be enhanced.

With reference to FIG. 1 and FIG. 2. In some embodiments where the first communication unit 13 and the second communication unit 22 are communicatively connected to each other in a contact type manner, to ensure that the mouse body 20 can be properly abut against the base 10 after the mouse body 20 is received in the receiving groove 112, the base 10 comprises a first guiding structure 15, and the mouse body 20 comprises a second guiding structure 27. The first guiding structure 15 is disposed on the first leaning surface 1121 of the receiving groove 112, and the second guiding structure 27 is disposed on the back surface 211 of the housing 21 of the mouse body 20. When the mouse body 20 is received in the receiving groove 112 of the base 10, and the first guiding structure 15 corresponds to the second guiding structure 27, the first connector 131 properly abuts against the second connector 221. Hence, the convenience of the mouse during operation can be enhanced.

With reference to FIG. 1. In some embodiments, the first guiding structure 15 may be a post structure, and the second guiding structure 27 may be a groove structure capable of being fitted over the post structure, but the instant disclosure is not limited thereto. It is noted that, in these embodiments, the first guiding structure 15 and the second guiding structure 27 can guide the mouse body 20 to be assembled in the receiving groove 112 of the base 10, so that the first connector 131 and the second connector 221 are communicatively connected to each other in a contact type manner. Furthermore, the mating between the convex structure and the concave structure of the first guiding structure 15 and the second guiding structure 27 allow the mouse body 20 and the base 10 to be positioned with each other. Hence, the stability of the mouse during operation can be enhanced.

With reference to FIG. 1. In some embodiments where the first communication unit 13 and the second communication unit 22 are communicatively connected to each other in a contact type manner, to ensure that the mouse body 20 can be properly abut against the base 10 after the mouse body 20 is received in the receiving groove 112, the base 10 comprises a first magnetic attractive member 16 and a first guiding structure 15, and the mouse body 20 comprises a second magnetic attractive member 28, a third magnetic attractive member 29, and a second guiding structure 27. Therefore, the base 10 and the mouse body 20 not only can be positioned with each other through the magnetic attraction but also can be guided with each other through the mating between the convex structure and the concave structure of the first guiding structure 15 and the second guiding structure 27. Hence, the stability of the mouse during operation can be enhanced.

With reference to FIG. 1, FIG. 2, FIG. 9, and FIG. 10. In some embodiments where the base 10 is wiredly communicatively connected to the electronic device through the electrical connection cable 17, the mouse body 20 does not have the power unit, and the mouse body 20 is disposed on the base 10 for operation.

With reference to FIG. 9 and FIG. 10. In some embodiments, the base 10 further comprises a slit 113, the slit 113 is on the bottom surface 111 of the case 11 of the base 10, and the slit 113 is defined through two ends of the bottom surface 11. In these embodiments, the electrical connection cable 17 is communicatively connected to the first sensing module S1 and the first communication unit 13 of the base 10, and the electrical connection cable 17 protrudes out of the bottom surface 111 of the case 11 of the base 10. Specifically, in this embodiment, a location where the electrical connection cable 17 protrudes out of the bottom surface 111 of the case 11 of the base 10 is between two ends of the slit 113. Therefore, when the user flips the base 10 to operate the mouse 10 with different operation modes, the electrical connection cable 17 can be received at different portions of the slit 113 so as to be protruded out of the base 10 with different directions, thus facilitating user's operation.

With reference to FIG. 8. In some embodiments, the first communication unit 13 is disposed on the case 11, and the position of the first communication unit 13 corresponds to the position of the receiving groove 112. Therefore, when the mouse body 20 is received in the receiving groove 112, the base 10 can be communicatively connected to the mouse body 20. Specifically, the first communication unit 13 is not limited to be disposed in or out of the receiving space of the case 11. In some embodiments, the first communication unit 13 is a noncontact type communication unit and disposed in the receiving space of the case 11.

The mouse according to a second embodiment of the instant disclosure is illustrated below accompanied with FIG. 7 to FIG. 12. The difference between the first embodiment and the second embodiment is at least that, in the second embodiment, the mouse body 20 is communicatively connected to the base 10 in a noncontact type manner. In this embodiment, descriptions about the configuration of the base 10 of the mouse and the connection and communication between the base 10 and the electronic device can be referred to the descriptions of the first embodiment and are not repeated here.

Figure 11:
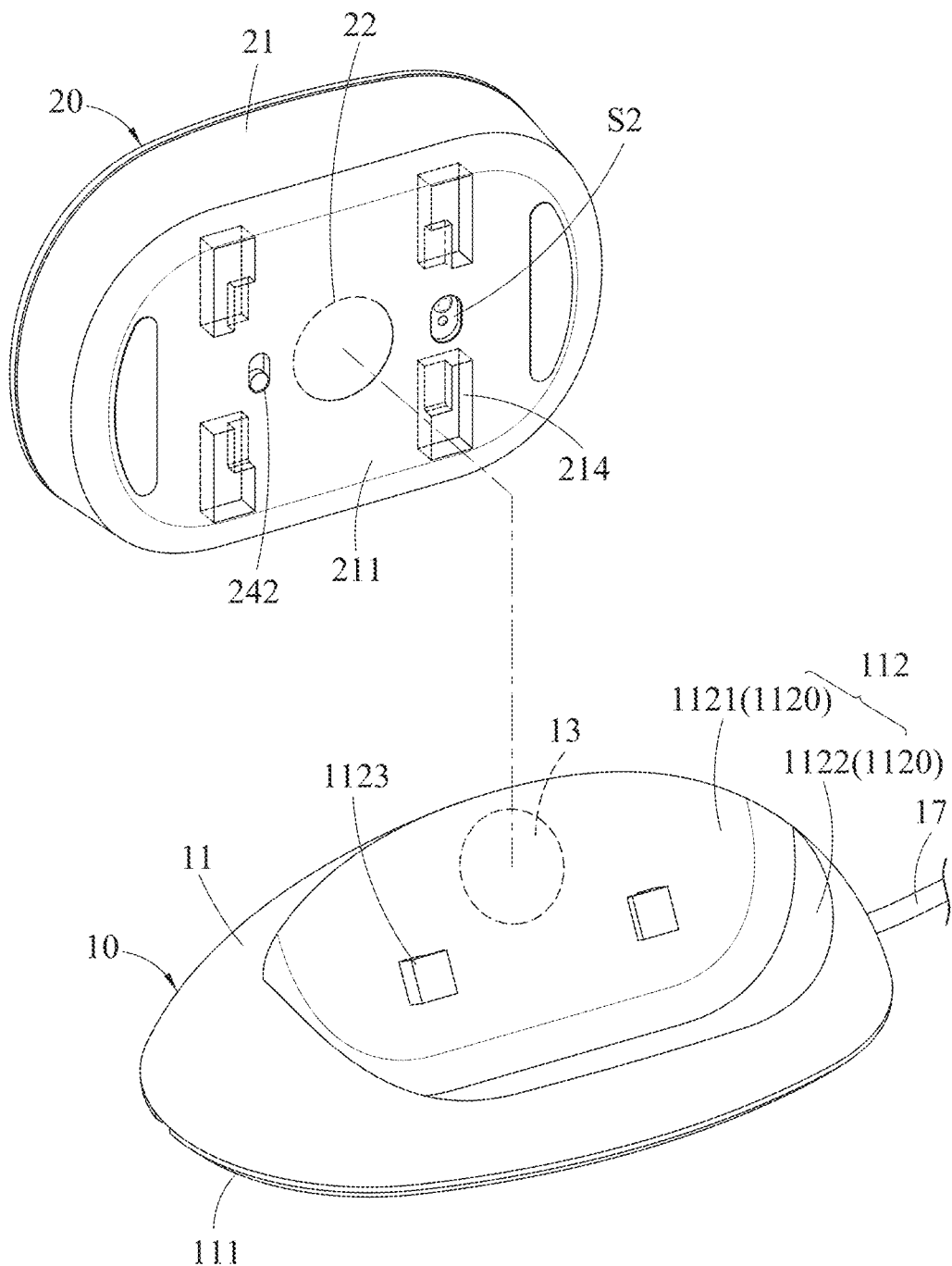
FIG. 11 illustrates an exploded view of a mouse according to an exemplary embodiment of the instant disclosure, which shows that the base and the mouse body are positioned with each other through the first positioning portion and the second positioning portion.
Figure 12:
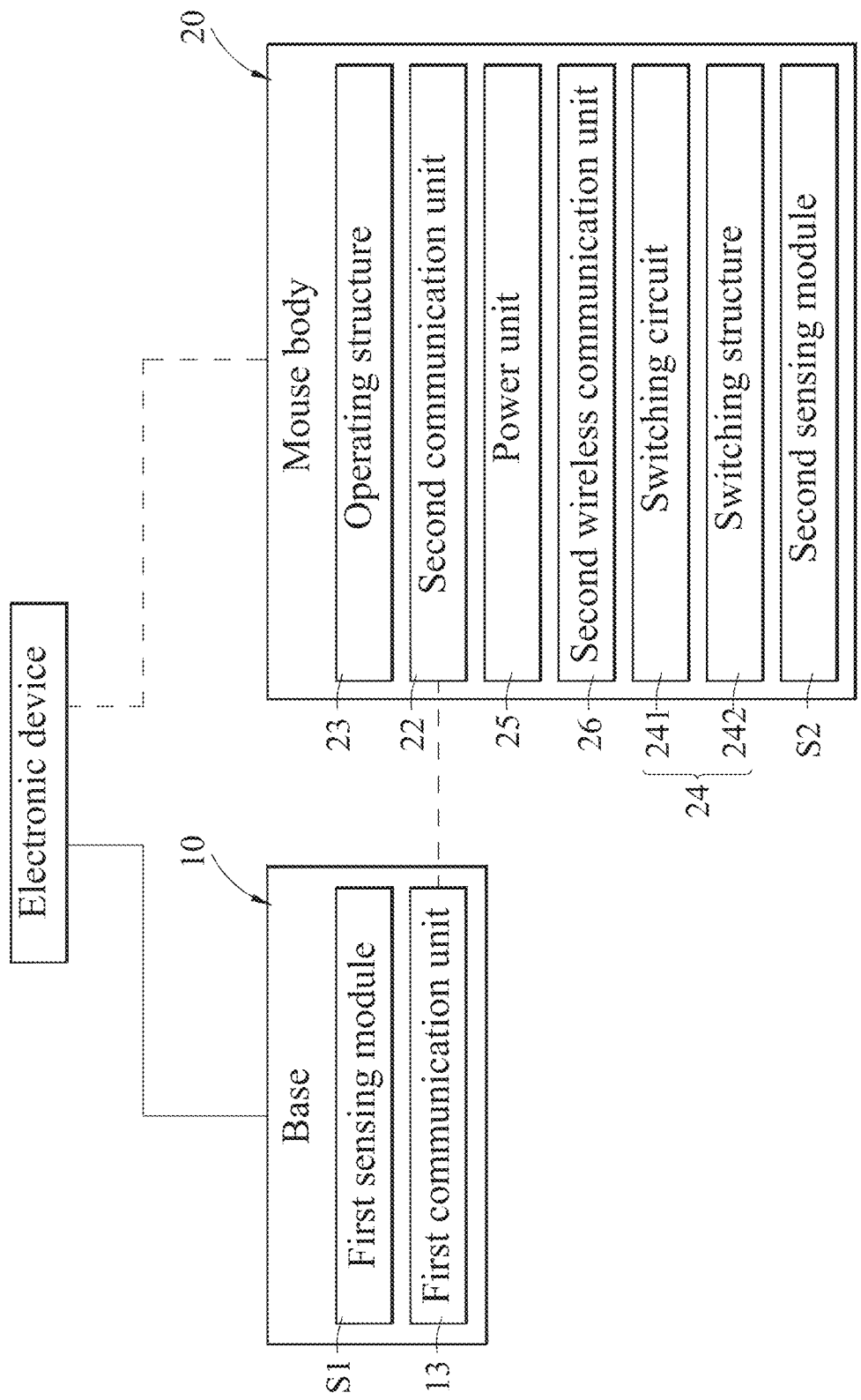
FIG. 12 illustrates a systematic block diagram of a mouse according to an exemplary embodiment of the instant disclosure, which shows the functions of the operating buttons are manually switched according to the switching structure.

With reference to FIG. 8, FIG. 11, and FIG. 12. In some embodiments, the first communication unit 13 of the base 10 and the second communication unit 22 of the mouse body 20 are corresponding noncontact type communication structures. In these embodiments, the first communication unit 13 is a near field communication (NFC) reader, and the second communication unit 22 is an NFC tag having a coil module. Therefore, as long as the mouse body 20 is received in the receiving groove 112 of the base 10, the communicational connection between the base 10 and the mouse body 20 can be achieved. Therefore, the base 10 can retrieve the operation of the user on the mouse body 20, so that the operation of the mouse body 20 is correspondingly presented on the electronic device.

With reference to FIG. 8 to FIG. 12. In some embodiments, the base 10 is communicatively connected to the electronic device through the electrical connection cable 17 (as shown in FIG. 9 and FIG. 10), and the base 10 is communicatively connected to the second communication unit 22 of the mouse body 20 through the first communication unit 13 in a noncontact type manner. In this embodiment, the user assembles the mouse body 20 on the base 10. When the user assembles the mouse body 20 on the base 10 to operate the mouse to move, the first sensing module S1 (as shown in FIG. 9 and FIG. 10) of the base 10 transmits a movement signal to the electronic device through the electrical connection cable 17 to correspond to the movement of the cursor. When the user operates the mouse and controls the operating structure 23 of the mouse body 20, the operating structure 23 generates a control signal, and the control signal is transmitted to the first communication unit 13 of the base 10 through the second communication unit 22 of a microcontroller unit (MCU) (not shown) of a circuit board in the mouse body 20. After the first communication unit 13 receives the control signal, the control signal of the mouse body 20 is transmitted to the electronic device through the electrical connection cable 17 between the base 10 and the electronic device to control the electronic device.

With reference to FIG. 8, FIG. 11, and FIG. 12. In some embodiments, the mouse body 20 further comprises a second wireless communication unit 26 and a second sensing module S2, and the second wireless communication unit 26 is disposed in the housing 21 of the mouse body 20 and partially exposed from the back surface 211 to detect the movement of the mouse body 20. In these embodiments, the mouse body 20 can be detached from the base 10 and is operated alone. When the bottom surface of the mouse body 20 is placed and moving on the operating surface (e.g., the surface of a desk), the second sensing module S2 of the mouse body 20 generates a movement signal and the movement signal is transmitted to the electronic device through the second wireless communication unit 26 of the microcontroller unit (MCU) of the circuit board in the mouse body 20 to control the movement of the cursor. When the user operates the mouse body 20 alone and controls the operating structure 23 of the mouse body 20, the operating structure 23 generates a control signal, and the second wireless communication unit 26 transmits the control signal to the electronic device to control the electronic device. In some embodiments, the second wireless communication unit 26 is a Bluetooth communication unit or a radiofrequency (RF) communication unit, but the instant disclosure is not limited thereto.

With reference to FIG. 11 and FIG. 12. In some embodiments, the switching module 24 of the mouse body 20 comprises a switching circuit 241 and a switching structure 242. The switching circuit 241 is disposed in the housing 21 of the mouse body 20 and is communicatively connected to the switching structure 242 and the operating buttons 231, and the switching structure 242 is disposed on the back surface 211 of the housing 21. Specifically, in some embodiments, the switching structure 242 may be a toggle. The switching circuit 241 is triggered by changing the position of the switching structure 242, and the switching circuit 241 can switch the functions of the operating buttons 231 through the triggering of the switching structure 242, but the instant disclosure is not limited thereto. In these embodiments, the switching module 24 is not limited to be manually switched and may also comprise, same as the first embodiment, the switching circuit 241 and the sensor 243 (as shown in FIG. 1 and FIG. 2). In this embodiment, the functions of the operating buttons 231 are automatically switched through the detection of the change of the orientation of the mouse body 20. The configuration and the operation of the switching module 24 can be referred to the descriptions of the first embodiment and are not repeated here.

With reference to FIG. 11. In some embodiments, the receiving groove 112 of the base 10 further comprises a first positioning portion 1123, and the housing 21 of the mouse body 20 further comprises a second positioning portion 214. When the mouse body 20 is received in the receiving groove 112 of the base 10, the mouse body 20 is positioned with the first positioning portion 1123 of the receiving groove 1112 through the second positioning portion 214. Therefore, the stability for assembling the mouse body 20 on the base 10 can be enhanced. In these embodiments, the first positioning portion 1123 is an L-shaped block, the second positioning portion 214 is a slot, and the mouse body 20 is slidably fitted over the first positioning portion 1123 in the L-shaped block configuration through the second positioning portion 214 in the slot configuration, but the instant disclosure is not limited thereto.

With reference to FIG. 7 to FIG. 12. In these embodiments, the base 10 is wiredly communicatively connected to the electronic device through the electrical connection cable 17. The mouse body 20 further comprises a power unit 25, and the power unit 25 and the second wireless communication unit 26 are electrically connected to each other and are respectively disposed in the housing 21 of the mouse body 20. In this embodiment, the mouse body 20 may be detached from the base 10 and turned to be powered by the power unit 25, and the second wireless communication unit 26 is communicatively connected to the electronic device, so that the mouse body 20 alone can be served as a common mouse. It is noted that, in some embodiments where the mouse body 20 can be detached from the base 10, the mouse body 20 is connected to the mains supply through the electrical connection cable 17, so that the electricity for the mouse body 20 can be provided by the mains supply; the power unit 25 may be a rechargeable battery, but the instant disclosure is not limited thereto.

Moreover, the electrical connection cable 17 of the mouse may be pluggable, one of two ends of the electrical connection cable 17 is pluggable connected to the base 10, and the other end of the electrical connection cable 17 is connected to the connection port of the electronic device. Hence, the mouse transmits information to the electronic device through the electrical connection cable 17 and obtains electricity from the electronic device through the electrical connection cable 17. In these embodiments, a rechargeable power unit 25 is disposed in the base 10. Therefore, the mouse can be connected to the connection port of the electronic device through the pluggable electrical connection cable 17, and the mouse is communicatively connected to the electronic device through the pluggable electrical connection cable 17. Hence, the rechargeable power unit 25 can be charged, and thus the electricity for operating the wireless mouse can be provided.

The mouse according to a third embodiment of the instant disclosure is illustrated below accompanied with FIG. 7, FIG. 10, FIG. 11, and FIG. 13. The difference between the second embodiment and the third embodiment is at least that, in the third embodiment, the mouse is wiredly communicatively connected to an external device capable of supplying electricity, and the mouse body 20 is, same as the second embodiment, wirelessly communicatively connected to the electronic device. In this embodiment, the descriptions about the wirelessly communication connection between the mouse body 20 and the electronic device can be referred to the descriptions of the second embodiment and are not repeated here. The base 10 of the mouse is connected to connection port of the external device (a device capable of supplying electricity and other than a computer) through the electrical connection cable 17, and the mouse obtains the electricity from the external device through the electrical connection cable 17.

Figure 13:
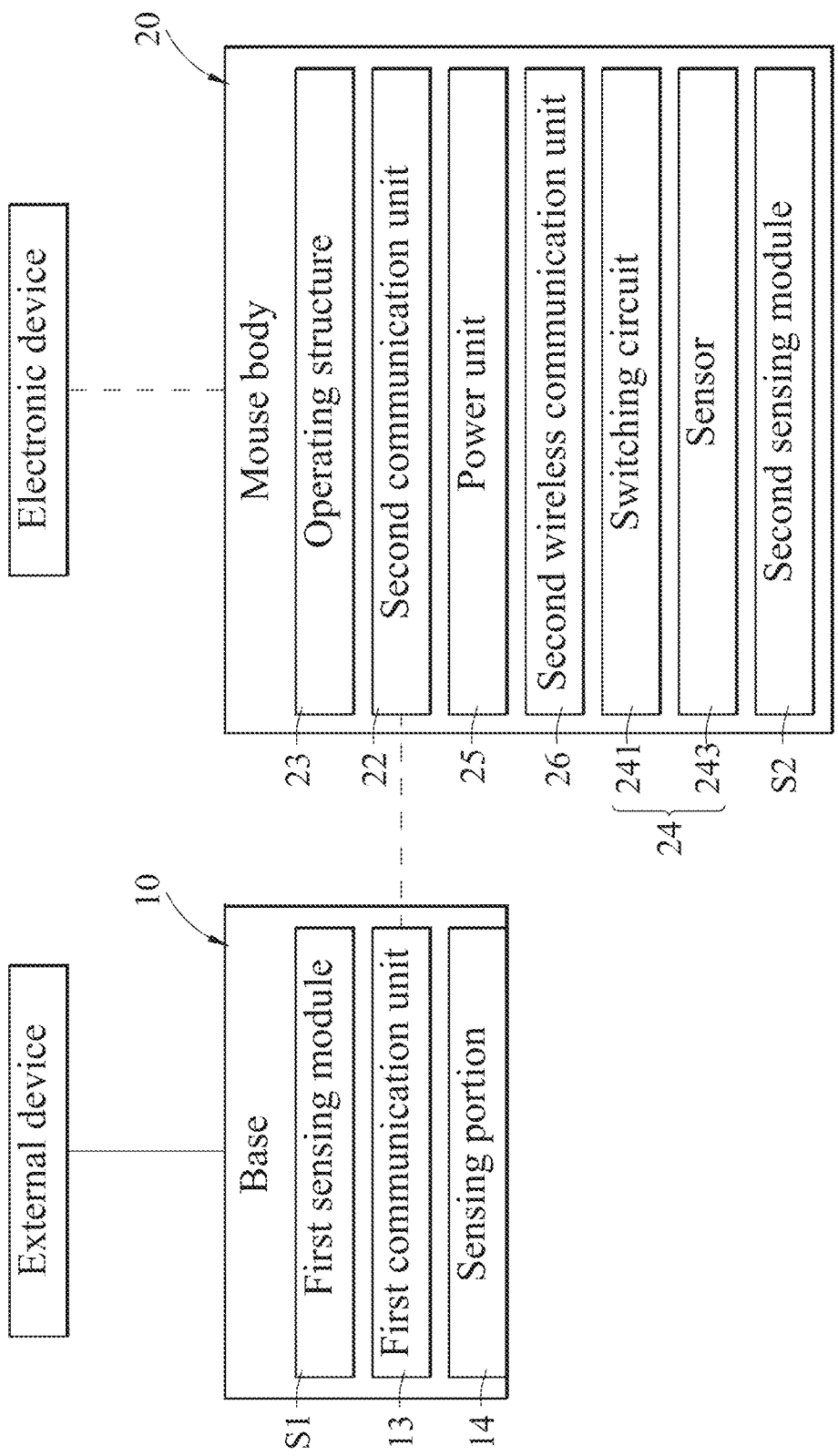
FIG. 13 illustrates a systematic block diagram of a mouse according to an exemplary embodiment of the instant disclosure, which shows that the base is connected to the external device and the mouse body switches the functions of the operating buttons according to the sensing of the sensor.

With reference to FIG. 13. In this embodiment, when the user assembles the mouse body 20 on the base 10 to operate the mouse to move, the first sensing module S1 of the base 10 transmits a movement signal to the second communication unit 22 of the mouse body 20 through the first communication unit 13, and the movement signal is transmitted to the electronic device through the second wireless communication unit 26 of a microcontroller unit (MCU) of a circuit board in the mouse body 20 to control the movement of the cursor. When the user assembles the mouse body 20 on the base 10 and controls the operating structure 23 of the mouse body 20, the operating structure 23 generates a control signal, and the control signal is transmitted to the electronic device through the second wireless communication unit 26 of the microcontroller unit (MCU) of a circuit board in the mouse body 20 to control the electronic device.

The mouse according to a fourth embodiment of the instant disclosure is illustrated below accompanied with FIG. 14. The difference between the second embodiment and the fourth embodiment is at least that, in the fourth embodiment, the base 10 of the mouse further comprises a first wireless communication unit 18, and the base 10 of the mouse is wirelessly communicatively connected to the electronic device through the first wireless communication unit 18.

Figure 14:
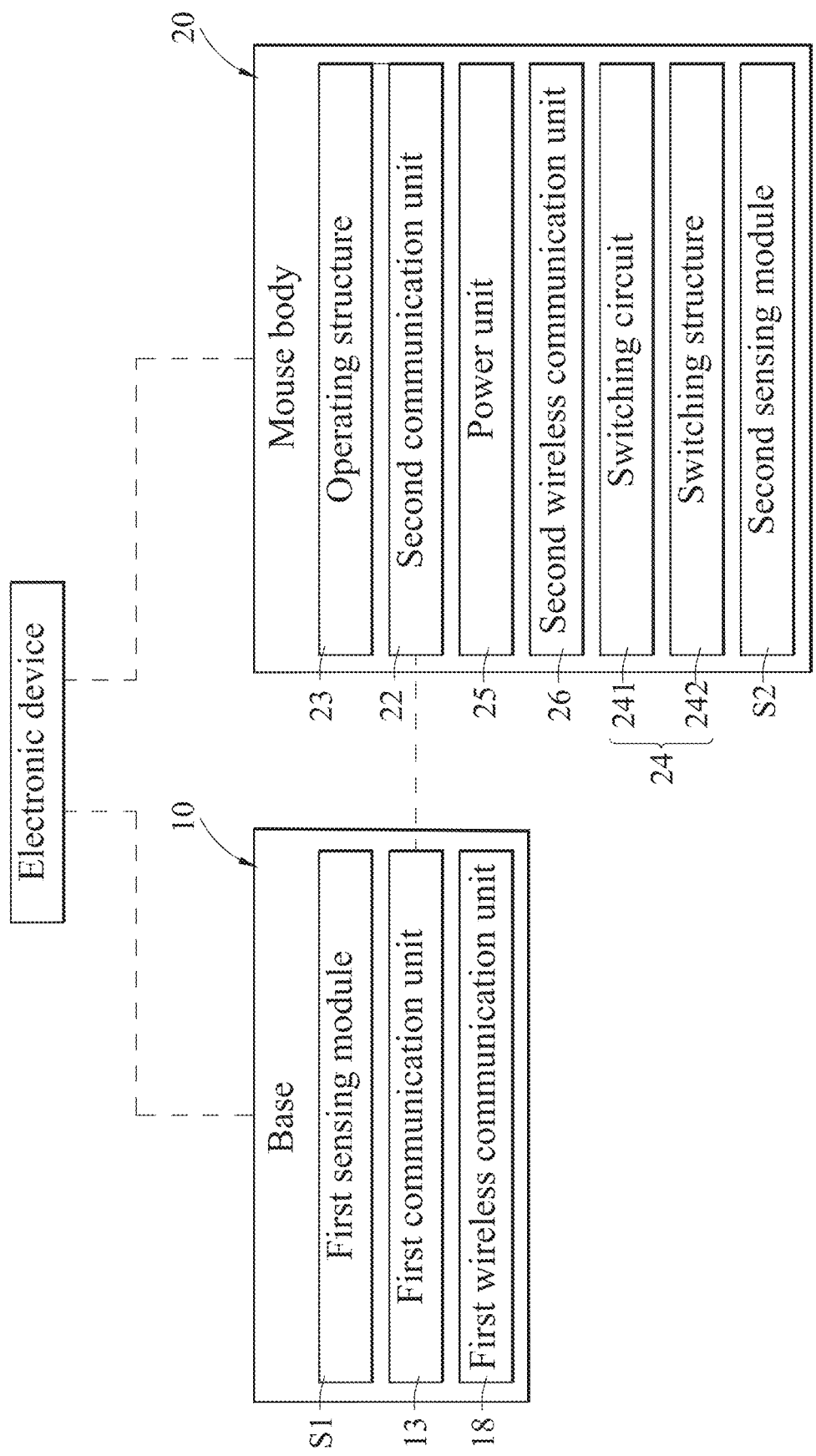
FIG. 14 illustrates a systematic block diagram of a mouse according to an exemplary embodiment of the instant disclosure, which shows that the base is provided with a first wireless communication unit and the mouse body is provided with a second wireless communication unit.

With reference to FIG. 14. In these embodiments, the user may assemble the mouse body 20 on the base 10 for operation or may detach the mouse body 20 from the base 10 and operates the mouse body 20 alone. When the user assembles the mouse body 20 on the base 10 to operate the mouse to move, the first sensing module S1 of the base 10 transmits a movement signal to the electronic device through the first wireless communication unit 18 to correspond to the movement of cursor. When the user assembles the mouse body 20 on the base 10 and controls the operating structure 23 of the mouse body 20, the operating structure 23 generates a control signal, the control signal is transmitted to the first communication unit 13 of a microcontroller unit (MCU) of a circuit in the base 10 through the second communication unit 22, and the first communication unit 13 receives the control signal and the control signal of the mouse body 20 is transmitted to the electronic device through the first wireless communication unit 18 to control the electronic device.

With reference to FIG. 14. In some embodiments, because the mouse body 20 comprises the second wireless communication unit 26, when the user assembles the mouse body 20 on the base 10 to operate the mouse to move or to control the operating structure 23 of the mouse body 20, the mouse body 20, same as the third embodiment, can directly transmit the movement signal or the control signal of the operating structure 23 of the mouse body 20 to the electronic device through the second wireless communication unit 26.

Based on the above, according to some embodiments, the user can place the mouse on an operating surface and operates the mouse, with the palm of the user placed standingly, thus reducing the pressure applied to the user's wrist during the operation of the mouse. Moreover, according to some embodiments, the user just needs to rotate the base and the mouse body respectively to allow the mouse to be suitable for right-handed users or left-handed users. Therefore, according to some embodiments, the same mouse is suitable for both the right-handed users and left-handed users, and the mouse thus provides a great convenience for the users.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A mouse comprising:
a base comprising a leaning surface and a bottom surface, an angle is between an extension direction of the leaning surface and the bottom surface, the leaning surface is arranged slantingly with respect to the bottom surface; and
a mouse body comprising a housing having a back surface, wherein the mouse body is detachably disposed on the base, the housing leans against the leaning surface, and the mouse body has a first operation mode and a second operation mode; under the first operation mode, the mouse body is disposed in the base with a first orientation and the back surface of the mouse body leans against the leaning surface, and under the second operation mode, the mouse body is detached from the base and rotated to a second orientation and disposed in the base and the back surface of the mouse body leans against the leaning surface.

2. The mouse according to claim 1, wherein the back surface of the housing of the mouse body is symmetrically arranged along a first symmetry axis and is symmetrically arranged along a second symmetry axis perpendicular to the first symmetry axis.

3. The mouse according to claim 2, wherein the first symmetry axis and the second symmetry axis are intersected at a symmetry center, the mouse body is selectively disposed on the leaning surface with one of a plurality of orientations, and the mouse body is rotated about the symmetry center, so that the mouse body is arranged with multiple orientations.

4. The mouse according to claim 3, wherein the profile of the leaning surface overlaps the profile of the back surface being rotated about the symmetry center, the symmetry center is at a central position of the first symmetry axis, and the symmetry center is also at a central position of the second symmetry axis.

5. The mouse according to claim 3, wherein the symmetry center of the mouse body is correspondingly on the leaning surface of the base.

6. The mouse according to claim 1, wherein the base further has a first positioning portion, a back surface of the mouse body further has a second positioning portion, and the mouse body is fitted over the first positioning portion through the second positioning portion.

7. The mouse according to claim 6, wherein the first positioning portion and the second positioning portion are a block or a slot respectively, and the slot is fitted over the block.

8. The mouse according to claim 1, wherein the base further comprises a first magnetic attractive member, and the mouse body further comprises a second magnetic attractive member and a third magnetic attractive member; when the mouse body is disposed on the leaning surface with the first orientation, the first magnetic attractive member is magnetically attracted to the second magnetic attractive member; when the mouse body is disposed on the leaning surface with the second orientation, the first magnetic attractive member is magnetically attracted to the third magnetic attractive member.

9. The mouse according to claim 8, wherein the third magnetic attractive member and the second magnetic attractive member are at opposite sides with respect to the first symmetry axis.

10. The mouse according to claim 1, further comprises:
a first communication unit disposed on the base, a position of the first communication unit corresponds to a position of the leaning surface; and
a second communication unit disposed on the mouse body, a position of the second communication unit corresponds to a position of the back surface, wherein the first communication unit is communicatively connected to the second communication unit.

11. The mouse according to claim 10, wherein the first communication unit and the second communication unit are corresponding noncontact type communication structures.

* * * * *